United States Patent
Hu et al.

(10) Patent No.: US 12,124,408 B2
(45) Date of Patent: Oct. 22, 2024

(54) METHOD AND APPARATUS FOR MODIFYING FILE NAME, AND STORAGE MEDIUM

(71) Applicant: Tencent Technology (Shenzhen) Company Limited, Shenzhen (CN)

(72) Inventors: Yue Hu, Shenzhen (CN); Yuan Hai, Shenzhen (CN); Chao Lin, Shenzhen (CN); Huaiqi Zhou, Shenzhen (CN); Wen Ge, Shenzhen (CN); Canhui Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 240 days.

(21) Appl. No.: 17/829,693

(22) Filed: Jun. 1, 2022

(65) Prior Publication Data

US 2022/0292056 A1 Sep. 15, 2022

Related U.S. Application Data

(63) Continuation of application No. PCT/CN2021/091278, filed on Apr. 30, 2021.

(30) Foreign Application Priority Data

May 19, 2020 (CN) .......................... 202010426569.X

(51) Int. Cl.
  *G06F 16/16* (2019.01)
  *G06F 16/14* (2019.01)
  *G06F 16/17* (2019.01)
(52) U.S. Cl.
  CPC .......... *G06F 16/148* (2019.01); *G06F 16/164* (2019.01); *G06F 16/168* (2019.01); *G06F 16/1734* (2019.01)

(58) Field of Classification Search
  CPC .... G06F 16/148; G06F 16/164; G06F 16/168; G06F 16/1734
  See application file for complete search history.

(56) References Cited

U.S. PATENT DOCUMENTS 5,572,729 A * 11/1996 Giordano ............... G06F 16/164
10,387,384 B1 * 8/2019 Bent ....................... G06F 16/185
(Continued)

FOREIGN PATENT DOCUMENTS

| CN | 104166669 A | 11/2014 |
| CN | 105630818 A | 6/2016 |
| CN | 110502235 A | 11/2019 |

OTHER PUBLICATIONS

International Search Report and Written Opinion with English Translation for International Patent Application No. PCT/CN2021/091278 dated Jul. 21, 2021, 11 pgs.

*Primary Examiner* — Kris E Mackes
(74) *Attorney, Agent, or Firm* — Crowell & Moring LLP

(57) ABSTRACT

This application discloses a method and an apparatus for modifying a file name and a storage medium. The method includes: displaying a first target file of which a name is to be modified, the first target file being currently located under a target level directory, and a current file name of the first target file being a first file name; receiving a file name modification operation for the first target file, the file name modification operation being used for instructing to perform a name modification operation on object files in a file set, and the object files being located under the target level directory and having a same file name as the first target file; and modifying file names of the object files in the file set from the first file name to a second file name in response to the file name modification operation.

20 Claims, 13 Drawing Sheets

(56) References Cited

U.S. PATENT DOCUMENTS

2003/0236797 A1* 12/2003 Nita .................. G06F 16/00
2005/0131959 A1*  6/2005 Thorman ............. G06F 16/168
2010/0114977 A1*  5/2010 Bacher ................ G06F 16/164
                                                707/E17.014
2017/0177574 A1   6/2017 Spillane et al.

* cited by examiner

METHOD AND APPARATUS FOR MODIFYING FILE NAME, AND STORAGE MEDIUM

RELATED APPLICATION

This application is a continuation application of PCT Patent Application No. PCT/CN2021/091278, filed on Apr. 30, 2021, which claims priority to Chinese Patent Application No. 202010426569.X, filed with the China National Intellectual Property Administration, PRC on May 19, 2020, each of which is incorporated by reference in its entirety.

FIELD OF THE TECHNOLOGY

This application relates to the field of computers, and in particular, to a method and an apparatus for modifying a file name, and a storage medium.

BACKGROUND OF THE DISCLOSURE

If files required for a page of a mini program are to be modified, often time a plurality of rename operations need to be repeated. When there are a relatively large quantity of files, omission and error may occur when files of a same name are recognized depending on human eyes. For example, the letter "l" and the number "1" may be difficult to recognize in some non-monospace fonts. As a result, the efficiency of modifying a file name is not high.

For the foregoing problem, no effective solution has been provided yet.

SUMMARY

Various embodiments provided in this application provide a method and an apparatus for modifying a file name and a storage medium.

According to an aspect of an embodiment of this disclosure, a method for modifying a file name is provided, performed by a computer device, the method including: displaying a first target file of which a name is to be modified, the first target file being currently located under a target level directory, and a current file name of the first target file being a first file name; receiving a file name modification operation for the first target file, the file name modification operation being used for instructing to perform a name modification operation on object files in a file set, and the object files in the file set being located under the target level directory and having a same file name as the first target file; and modifying the file names of the object files in the file set from the first file name to a second file name in response to the file selection operation.

In one implementation, the modifying the file names of the object files in the file set from the first file name to a second file name in response to the file name modification operation includes: displaying a command list of the first target file, the command list including a name modification command item corresponding to the first target file, the name modification command item being used for indicating that name modification is performed on target files having a same file name as the first target file under the target level directory; displaying the target files in response to a selection operation for the name modification command item; and in response to the file name modification operation, determining the object files in the file set from the target files, and modifying the file names of the object files in the file set from the first file name to the second file name.

In one implementation, configuration items corresponding to the target files are displayed, and the determining the object files in the file set from the target file includes: using files checked in the configuration items respectively corresponding to the target files as the object files in the file set.

In one implementation, the method further includes: displaying a file name input region, the file name input region being used for inputting a modified file name; and obtaining the second file name in response to a name input operation for the name input region.

In one implementation, in a case of the modifying the file names of the object files in the file set from the first file name to a second file name, the method further includes: obtaining a first adjustment instruction in a case that at least one object file has a same name as a file under the target level directory, the same name being used for indicating that files have a same file name and a same file name extension, and the first adjustment instruction being used for instructing to stop performing name modification on the object files in the file set; obtaining a current modification progress in response to the first adjustment instruction, the current modification progress being used for indicating that name modification on i object files in the file set has been currently completed, i being an integer greater than 1 and less than N, and N being a quantity of object files in the file set; and stopping performing name modification on an $(i+1)^{th}$ object file to an $N^{th}$ object file in the file set.

In one implementation, in a case of the stopping performing name modification on an $(i+1)^{th}$ object file to an $N^{th}$ object file in the file set, the method further includes: restoring file names of the first i object files in the file set to the first file name.

In one implementation, in a case of the modifying the file names of the object files in the file set from the first file name to a second file name, the method further includes: in a case that at least one object file has a same name as a file under the target level directory, determining the at least one object file as a first target object file; and obtaining a second adjustment instruction, the second adjustment instruction being used for instructing to skip the first target object file and obtain a next object file for name modification.

In one implementation, in a case of the modifying the file names of the object files in the file set from the first file name to a second file name, the method further includes: in a case that at least one object file has a same name as a file under the target level directory, determining the at least one object file as a second target object file and a file having a same name as the second target object file as a conflict file; and obtaining a third adjustment instruction, the third adjustment instruction being used for instructing to replace the conflict file with the second target object file.

According to another aspect of an embodiment of this disclosure, an apparatus for modifying a file name is further provided, including: a displaying unit, configured to display a first target file of which a name is to be modified, the first target file being currently located under a target level directory, and a current file name of the first target file being a first file name; a receiving unit, configured to receive a file name modification operation for the first target file, the file name modification operation being used for instructing to perform a name modification operation on object files in a file set, and the object files in the file set being located under the target level directory and having a same file name as the first target file; and a responding unit, configured to modify the file names of the object files in the file set from the first file name to a second file name in response to the file selection operation.

According to another aspect of an embodiment of this disclosure, a method for modifying a file name is further provided, performed by a computer device, the method including: receiving a first operation instruction to modify a file name, the first operation instruction carrying a first file name corresponding to a first target file and a target level directory, the first operation instruction being used for instructing to perform a name modification operation on object files in a file set, and the object files in the file set being located under the target level directory and having a same file name as the first target file; modifying the file names of the object files in the file set from the first file name to a second file name in response to the first operation instruction.

According to another aspect of an embodiment of this disclosure, an apparatus for modifying a file name is further provided, including: a first operation instruction receiving module, configured to receive a first operation instruction to modify a file name, the first operation instruction carrying a first file name corresponding to a first target file and a target level directory, the first operation instruction being used for instructing to perform a name modification operation on object files in a file set, and the object files in the file set being located under the target level directory and having a same file name as the first target file; a modification module, configured to modify the file names of the object files in the file set from the first file name to a second file name in response to the first operation instruction.

One or more non-transitory storage media storing computer-readable instructions are provided, the computer-readable instructions, when executed by one or more processors, causing the processors to perform the operations of the foregoing method for modifying a file name.

A computer device is provided, including a memory and a processor, the memory storing computer-readable instructions, the computer-readable instructions, when executed by the processor, causing the processor to perform the operations of the foregoing method for modifying a file name.

Details of one or more embodiments of this disclosure are provided in the accompanying drawings and descriptions below. Other features, objectives, and advantages of this application become apparent from the specification, the drawings, and the claims.

BRIEF DESCRIPTION OF THE DRAWINGS

The accompanying drawings described herein are used for providing a further understanding of this application, and form part of this application. Exemplary embodiments of this disclosure and descriptions thereof are used for explaining this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this disclosure with reference to the accompanying drawings in the embodiments of this disclosure. Apparently, the described embodiments are only some of the embodiments of this disclosure rather than all of the embodiments. All other embodiments obtained by a person of ordinary skill in the art based on the embodiments of this disclosure without creative efforts shall fall within the protection scope of this application.

In this specification, the claims, and the accompanying drawings of the embodiments of this disclosure, the terms "first", "second", and so on are intended to distinguish similar objects but do not necessarily indicate a specific order or sequence. It is to be understood that the data termed in such a way is interchangeable in proper circumstances, so that the embodiments of this disclosure described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

Figure 1:
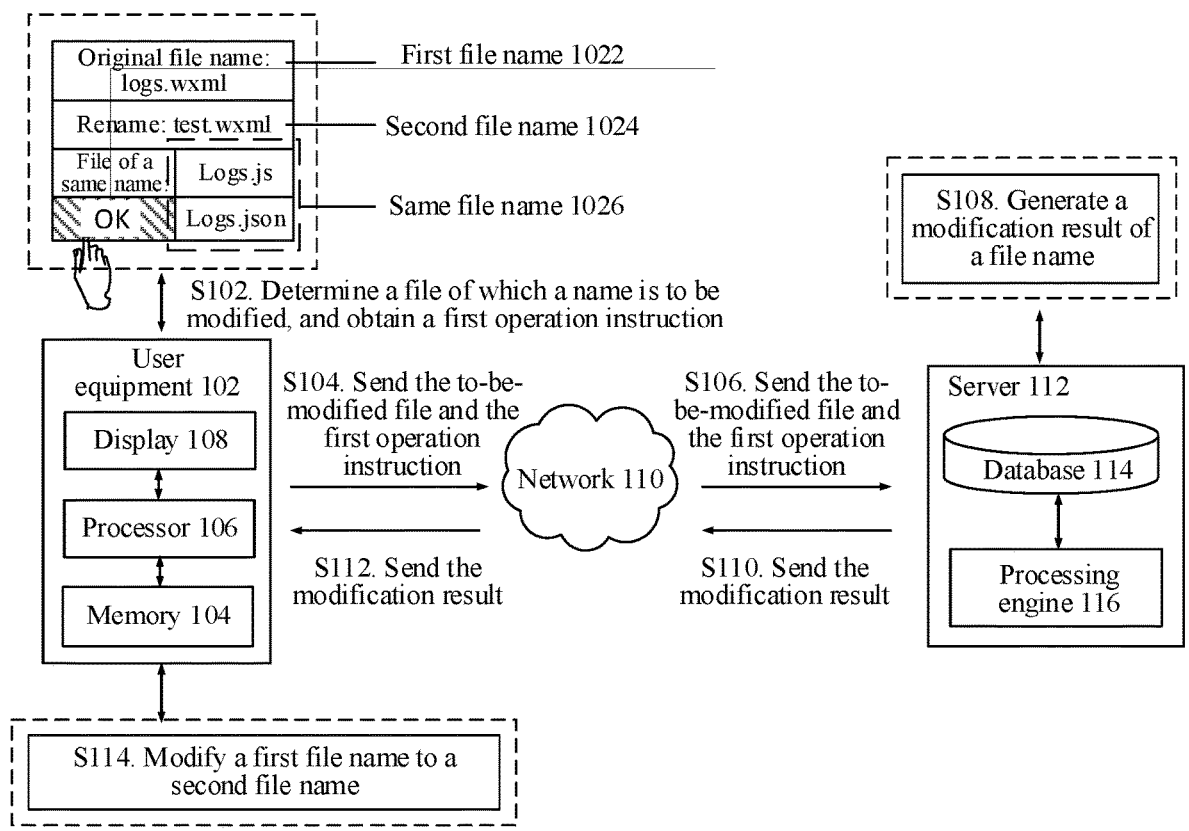
FIG. 1 is a schematic diagram of an exemplary application environment of an optional method for modifying a file name according to an embodiment of this disclosure.

According to an aspect of an embodiment of this disclosure, a method for modifying a file name is provided. Optionally, in one implementation, the method for modifying a file name is applicable to, but not limited to, an environment shown in FIG. 1. The environment may include, but not limited to, a user equipment 102, a network 110, and a server 112. The user equipment 102 may include, but not limited to, a display 108, a processor 106, and a memory 104.

The user equipment may perform the following steps: displaying a first target file of which a name is to be modified, the first target file being currently located under a target level directory, and a current file name of the first target file being a first file name; receiving a file name modification operation for the first target file, the file name modification operation being used for instructing to perform a name modification operation on object files in a file set, and the object files in the file set being located under the target level directory and having a same file name as the first target file; and modifying the file names of the object files in the file set from the first file name a second file name in response to the file name modification operation.

The user equipment displays the first target file. For example, when receiving an operation of displaying a file under a target level directory, the user equipment displays the first target file. For example, the user equipment may display the first target file by using a developer tool. The first target file may be a related file in the developer tool. The developer tool may be, for example, an integrated development environment (IDE) for creating, editing, de-bugging, and releasing a mini program. In some embodiments, the mini program may be a sub-application within the WeChat ecosystem. In one implementation, the mini program may be launched directly within WeChat.

A level directory may be information representing a position of storing a file. For example, a file directory may be divided into a plurality of levels, the plurality of meaning at least two. Files of different types or different functions may be stored by classification by using a multi-level directory structure, to facilitate file management and search. For example, one level directory may represent one folder. In one implementation, a level directory may also be referred to as a directory. In one implementation, the level may represent a depth of the directory relative to a parent directory, such as the root directory.

The file name modification operation is used for instructing to uniformly modify names of files which are: 1. located under a same level directory as the first target file, and 2. have a same file name as the first target file. The file name modification operation may be, for example, a gesture operation or a touch operation on a control interface displayed in the user equipment. The second file name is a modified name and may be obtained in response to a file name input operation of a user or may be preset.

In one example, the first target file and the object files may be located in a same folder. By using the method for modifying a file name provided in this embodiment of this disclosure, when a name of a first target file is modified, names of other files located in the same folder as the first target file and having a same name as the first target file may be modified together. In some embodiments, a file may be identified by, for example, a full name containing two parts: a file name, and a file extension (or extension for simplicity). For example, in the developer tool, there are usually files with a same file name but different extension names, that is, file formats (or file types). As an example, referring to FIG. 3, a folder may have multiple log related files of different type/format, such as, logs.js, logs.json, logs.wxml, logs.wxss. These files all share a same file name, i.e., "logs", but each file has a different extension (or file extension, file name extension), such as "js", "json", etc. By using the method provided in this embodiment of this disclosure, file names of files with a same file name but different extension names may be uniformly modified. For example, files of which file names are "logs" in the developer tool are uniformly modified to "text", so that the modified files have the same file name but different extension names. After the file name modification, the files will be re-named as, for example, text.js, text.json, text.wxml, test.wxss. In this example, only the first target file needs to be checked or selected (e.g., logs.js), and a file name of the first target file, as well as names of other files located under the same level directory and having the same file name (logs.json, logs.wxml, logs.wxss) may be modified together.

The server may perform the following steps: receiving a first operation instruction to modify a file name, the first operation instruction carrying a first file name corresponding to a first target file and a target level directory, the first operation instruction being used for instructing to perform a name modification operation on object files in a file set, and the object files in the file set being located under the target level directory and having a same file name as the first target file; and modifying the file names of the object files in the file set from the first file name to a second file name in response to the first operation instruction. It may be understood that the steps performed by the server may also be performed by the user equipment. The first operation instruction may further carry unique identifiers of files of which names are to be modified together. Therefore, the server may determine the files of which the names are to be modified from the target level directory based on the unique identifiers.

A specific process may be as the following steps.

Step S102. A user equipment 102 determines, by using a selection operation obtained from a display 108, a first target file of which a name is to be modified (in this case, a file name is a first file name 1022), and determines a first operation instruction by using a modification operation performed on the first target file and obtained from the display 108.

Steps S104 and S106. The user equipment 102 sends the first target file and the first operation instruction to a server 112 through a network 110.

Step S108. The server 112 searches a database 114 for a file set located under a target level directory and having a same file name 1026 as the first target file, and processes file names in the file set by using a processing engine 116, to generate a modification result.

Steps S110 and S112. The server 112 sends the modification result to the user equipment 102 through the network 110.

Step S114. A processor 106 in the user equipment 102 modifies the first file name 1022 to a second file name 1024 according to the modification result, displays the modification result in the display 108, and stores the modified file name and corresponding file information in a memory 104. Optionally, the modification result may be generated and stored in the server 112 or the user equipment 102 but is not limited thereto.

Figure 2:
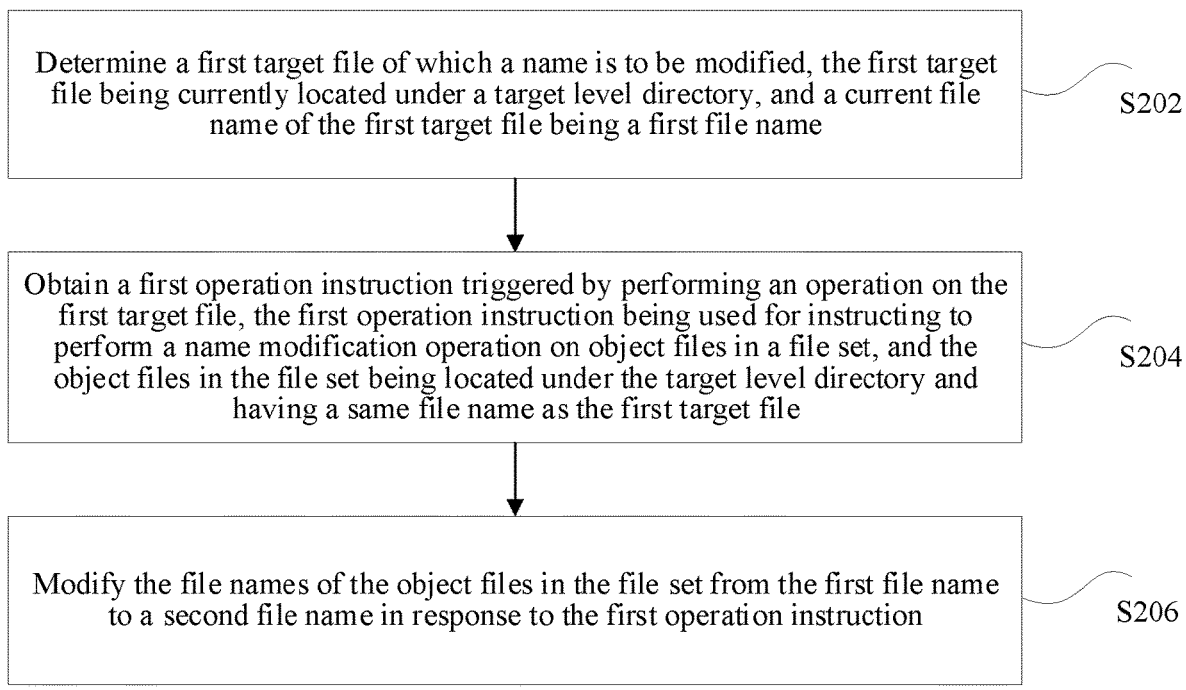
FIG. 2 is a schematic flowchart of an exemplary method for modifying a file name according to an embodiment of this disclosure.

In one implementation, as shown in FIG. 2, the method for modifying a file name includes the following steps.

S202. Determine a first target file of which a name is to be modified, the first target file being currently located under a target level directory, and a current file name of the first target file being a first file name.

S204. Obtain a first operation instruction triggered by performing an operation on the first target file, the first operation instruction being used for instructing to perform a name modification operation on object files in a file set, and the object files in the file set being located under the target level directory and having a same file name as the first target file.

S206. Modify the file names of the object files in the file set from the first file name to a second file name in response to the first operation instruction.

Optionally, in this embodiment, the method for modifying a file name is applicable to, but not limited to, a scenario of renaming a plurality of files with a same name in batches, to make it files of the same name with another name. A file name may include, but not limited to, a file main name and an extension name. Optionally, in this embodiment, the file name may be, but not limited to, the file main name. File names of files under the target level directory may be, but not limited to, the same (files of a same name).

A first target file of which a name is to be modified is determined, the first target file being currently located under a target level directory, and a current file name of the first target file being a first file name; a first operation instruction triggered by performing an operation on the first target file is obtained, the first operation instruction being used for instructing to perform a name modification operation on object files in a file set, and the object files in the file set being located under the target level directory and having a same file name as the first target file; and the file names of the object files in the file set are modified from the first file name to a second file name in response to the first operation instruction.

Figure 3:
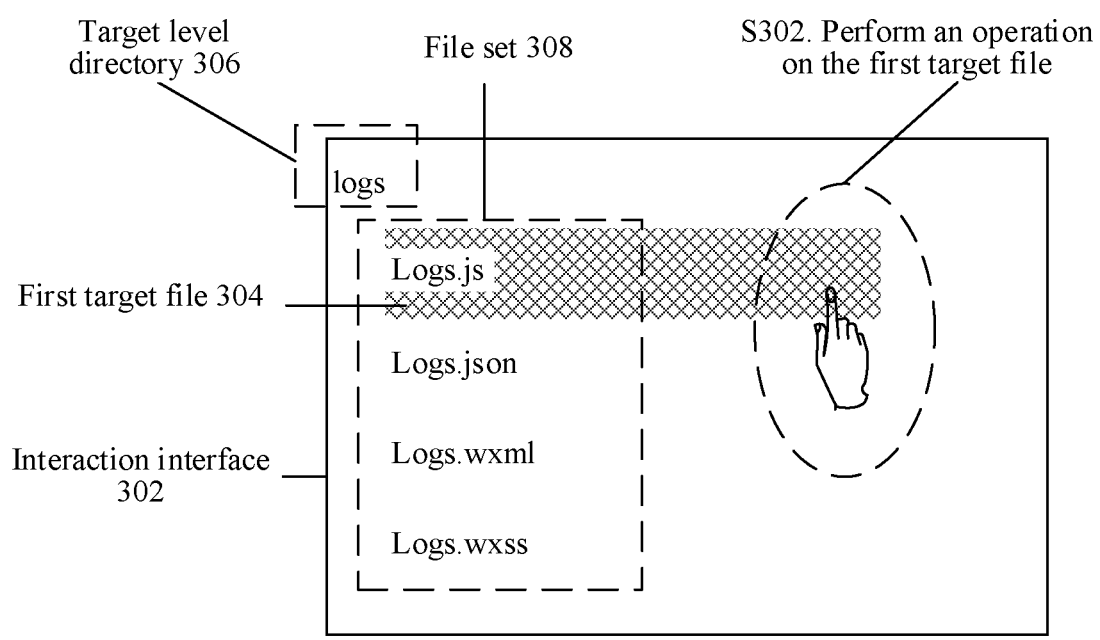
FIG. 3 is a schematic diagram of another exemplary method for modifying a file name according to an embodiment of this disclosure.

A description is further made by using an example. Optionally, for example, as shown in FIG. 3, there are an interaction interface 302 configured to detect execution of an operation, a first target file 304, and other files under a same target level directory 306 as the first target file 304. File names of the first target file 304 and other files are all first file names, and the first target file and other files together form a file set 308. Specific steps are as follows: step S302. Obtain a first operation instruction (not shown in the figure) triggered by performing an operation such as an operation of selecting the first target file 304 on the first target file 304, and modify file names of files in the file set 308 from the first file name to a second file name in response to the first operation instruction.

According to this embodiment of this disclosure, a first target file of which a name is to be modified is displayed, the first target file being currently located under a target level directory, and a current file name of the first target file being a first file name; a first operation instruction triggered by performing an operation on the first target file is obtained, the first operation instruction being used for instructing to perform a name modification operation on object files in a file set, and the object files in the file set being located under the target level directory and having a same file name as the first target file; and the file names of the object files in the file set is modified from the first file name to a second file name in response to the first operation instruction. Uniform name modification is performed on files under a target level directory and having a same name, to achieve a technical objective of reducing redundant operations in a file name modification process, thereby achieving a technical effect of improving the file name modification efficiency.

In one implementation, the obtaining a first operation instruction triggered by performing an operation on the first target file includes the following steps.

S1. Obtain a second operation instruction triggered by performing the operation on the first target file, the second operation instruction being used for requesting to obtain all files having a same file name as the first target file under the target level directory.

S2. Display all the files in response to the second operation instruction.

S3. Determine the object files in the file set from all the files, and generate the first operation instruction based on the file set.

A second operation instruction triggered by performing the operation on the first target file is obtained, the second operation instruction being used for requesting to obtain all files having a same file name as the first target file under the target level directory; all the files are displayed in response to the second operation instruction; and the object files in the file set are determined from all the files, and the first operation instruction is generated based on the file set.

In one implementation, the modifying the file names of the object files in the file set from the first file name to a second file name in response to the file name modification operation includes: displaying a command list associated with the first target file, the command list including a name modification command item corresponding to the first target file, the name modification command item being used for indicating that name modification is performed on target files having a same file name as the first target file under the target level directory; displaying the target files in response to a selection operation for the name modification command item; and determining the object files in the file set from the target files in response to a file selection operation, and modifying the file names of the object files in the file set from the first file name to the second file name.

The file name modification operation may include a plurality of operations, for example, a selection operation for selecting the name modification command item and a file selection operation for selecting file(s). The file selection operation is used for selecting a file of which a name is to be modified from the target files. The target files may be all files of which file names are the first file name under the target level directory. When receiving the selection operation for the name modification command item, a terminal triggers a second operation instruction. When a file of which a name is to be modified is determined based on the file selection operation, and it is determined that the file has been selected, for example, when an operation of determining to modify the name is received, for example, when a touch operation on an "OK" control in FIG. 5 is received, the first operation instruction is triggered, and the file names of the object files in the file set are modified from the first file name to the second file name.

Figure 4:
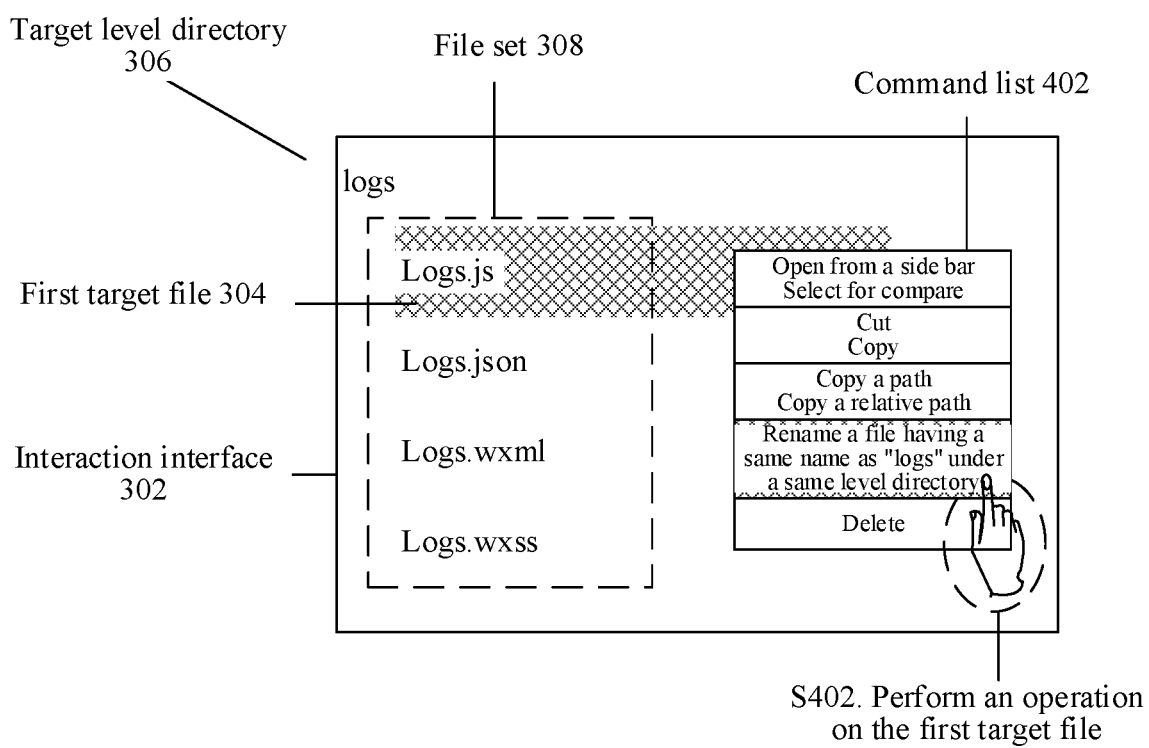
FIG. 4 is a schematic diagram of another exemplary method for modifying a file name according to an embodiment of this disclosure.

A description is further made by using an example. Optionally, as shown in FIG. 4, there is a command list 402 used for controlling a selected first target file 304 of which a name is to be modified to perform a corresponding command instruction. The command list may be displayed in response to a command list displaying operation for the first target file. For example, the command list may be displayed when an operation of "clicking a right key" for the first target file is received. Optionally, as shown in the figure, the command list 402 includes a plurality of executable commands such as "open from a side bar", "select for compare", "cut", "copy", "copy a path", "copy a relative path", "rename a file having a same name as "logs" under a same level directory", and "delete". The name modification command item corresponding to the first target file may be, for example, "rename a file having a same name as "logs" under a same level directory". The selection operation for the name modification command item is, for example, an operation of selecting "rename a file having a same name as "logs" under a same level directory" in the command list 402, and the target files may be all files in the file set 308. Specific steps are as follows: step S402. Obtain a second operation instruction triggered by performing the operation (selecting "rename a file having a same name as "logs" under a same level directory" in the command list 402) on the first target file, and display all files (all the files in the file set 308) in response to the second operation instruction.

In one implementation, the method for modifying a file name further includes: displaying a file name input region, the file name input region being used for inputting a modified file name; and obtaining the second file name in response to a name input operation for the name input region.

Figure 5:
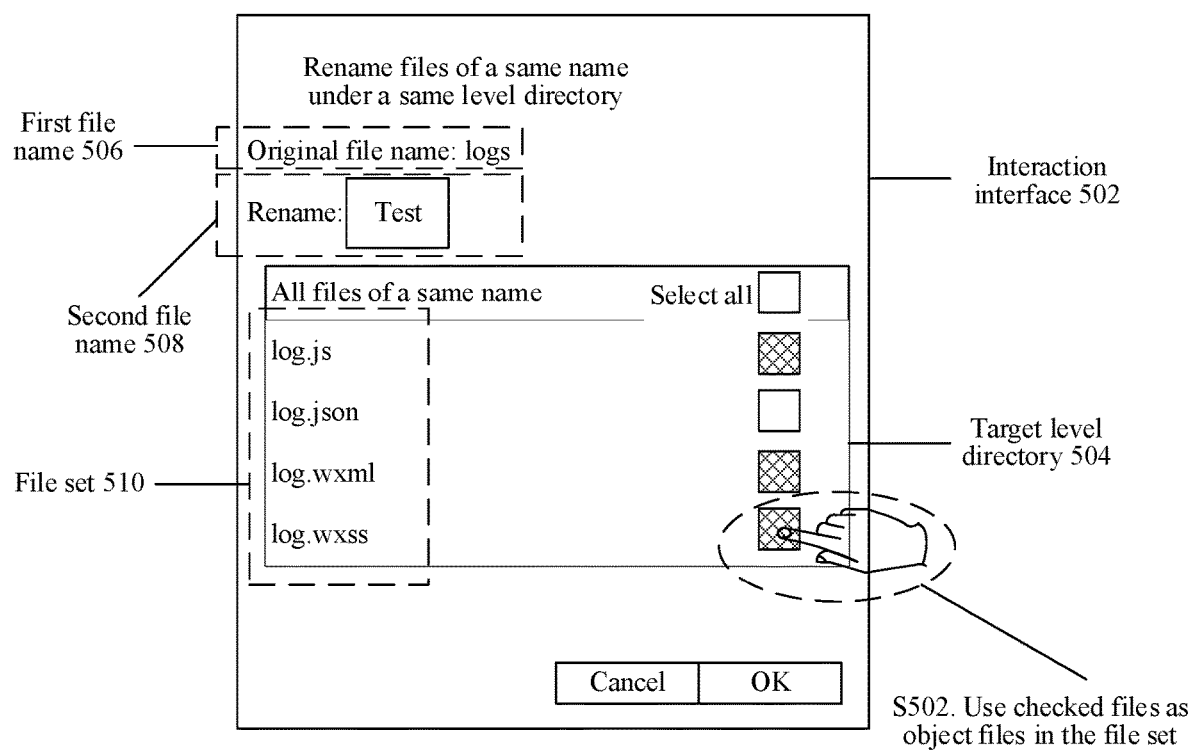
FIG. 5 is a schematic diagram of another exemplary method for modifying a file name according to an embodiment of this disclosure.

The file name input region may be, for example, a rectangular box corresponding to "rename" in FIG. 5. The name input operation is an operation used for inputting a name. For example, a renamed file name, that is, the second file name, may be inputted into the rectangular box.

According to this embodiment of this disclosure, a second operation instruction triggered by performing the operation on the first target file is obtained, the second operation instruction being used for requesting to obtain all files having a same file name as the first target file under the target level directory; all the files are displayed in response to the second operation instruction; and the object files in the file set are determined from all the files, and for example, when an operation on the "OK" control in FIG. 5 is received, a first operation instruction is generated based on the file set, to achieve an objective that a plurality of checked files together execute a command, thereby achieving an effect of improving the command execution efficiency.

In one implementation, the determining the object files in the file set from all the files includes: using files checked in configuration items respectively corresponding to all the files as the object files in the file set.

In a case of the determining the object files from all the files, the method further includes: obtaining the configured second file name.

the determining the object files in the file set from all the files includes: using files checked in configuration items respectively corresponding to all the files as the object files in the file set. In a case of the determining the object files from all the files, the method further includes: obtaining the configured second file name.

A description is further made by using an example. Optionally, configuration items corresponding to the target files are displayed. The configuration item is an option used for configuring whether the target files need to be renamed, for example, may be a check box in FIG. 5. As shown in FIG. 5, there are an interaction interface 502 configured to obtain an operation signal and a plurality of files (that is, all files of a same name) in a file set 510 under a target level directory 504. An original file name "logs" is a first file name 506, and a renamed "Test" is a second file name 508. Specific steps are as follows: using files (in shades) checked in configuration items respectively corresponding to all the files as object files in the file set 510, and obtaining the configured second file name 508.

According to this embodiment of this disclosure, the determining the object files in the file set from all the files includes: using files checked in configuration items respectively corresponding to all the files as the object files in the file set; and in a case of the determining the object files from all the files, the method further includes: obtaining the configured second file name, to achieve an objective of selectively modifying file names in batches, thereby achieving an effect of improving the flexibility of file modification.

In one implementation, in a case of the modifying the file names of the object files in the file set from the first file name to a second file name, the method further includes the following steps.

S1. Obtain a first adjustment instruction in a case that at least one object file has a same name as a file under the target level directory, the same name being used for indicating that files have a same file name and a same file name extension, and the first adjustment instruction being used for instructing to stop performing name modification on the object files in the file set. In one embodiment, to determine whether two files have a same name, the full name of the file (i.e., file name+extension) may be used. For example, under a same directory, there may be multiple files sharing a same file name, but each file has a unique extension. As an example, log.js and log.json have a same file name "log", and each file has a different extension (i.e., "js" and "json"). As such, even the file name is the same, these two files have different full names. In one embodiment, when renaming a file, it is considered that the file is renamed from a source file name to a destination file name. For example, "log.js" is renamed to "text.js". The file name is renamed from "log" to "text", but the extension is the same. Also notice the full name of the file is changed. In this step S1, the destination file name (in full name format) of the object file may be compared with a full name of a file under the target level directory. When there is a match, there may exist a potential file name conflict.

S2. Obtain a current modification progress in response to the first adjustment instruction, the current modification progress being used for indicating that name modification on i object files in the file set has been currently completed, i being an integer greater than 1 and less than N, and N being a quantity of object files in the file set.

S3. Stop performing name modification on an $(i+1)^{th}$ object file to an $N^{th}$ object file in the file set.

A first adjustment instruction is obtained in a case that at least one object file has a same name (e.g., full name) as a file under the target level directory, the same name being used for indicating that files have a same file name and a same file name extension, and the first adjustment instruction being used for instructing to stop performing name modification on the object files in the file set; a current modification progress is obtained in response to the first adjustment instruction, the current modification progress being used for indicating that name modification on i object files (e.g., the first i object files) in the file set has been currently completed, i being an integer greater than 1 and less than N, and N being a quantity of object files in the file set; and name modification on an $(i+1)^{th}$ object file to an $N^{th}$ object file in the file set is stopped. Optionally, N is a positive integer greater than or equal to 1. As described earlier, a full file name may be used for distinguishing different files in a computer.

Figure 6:
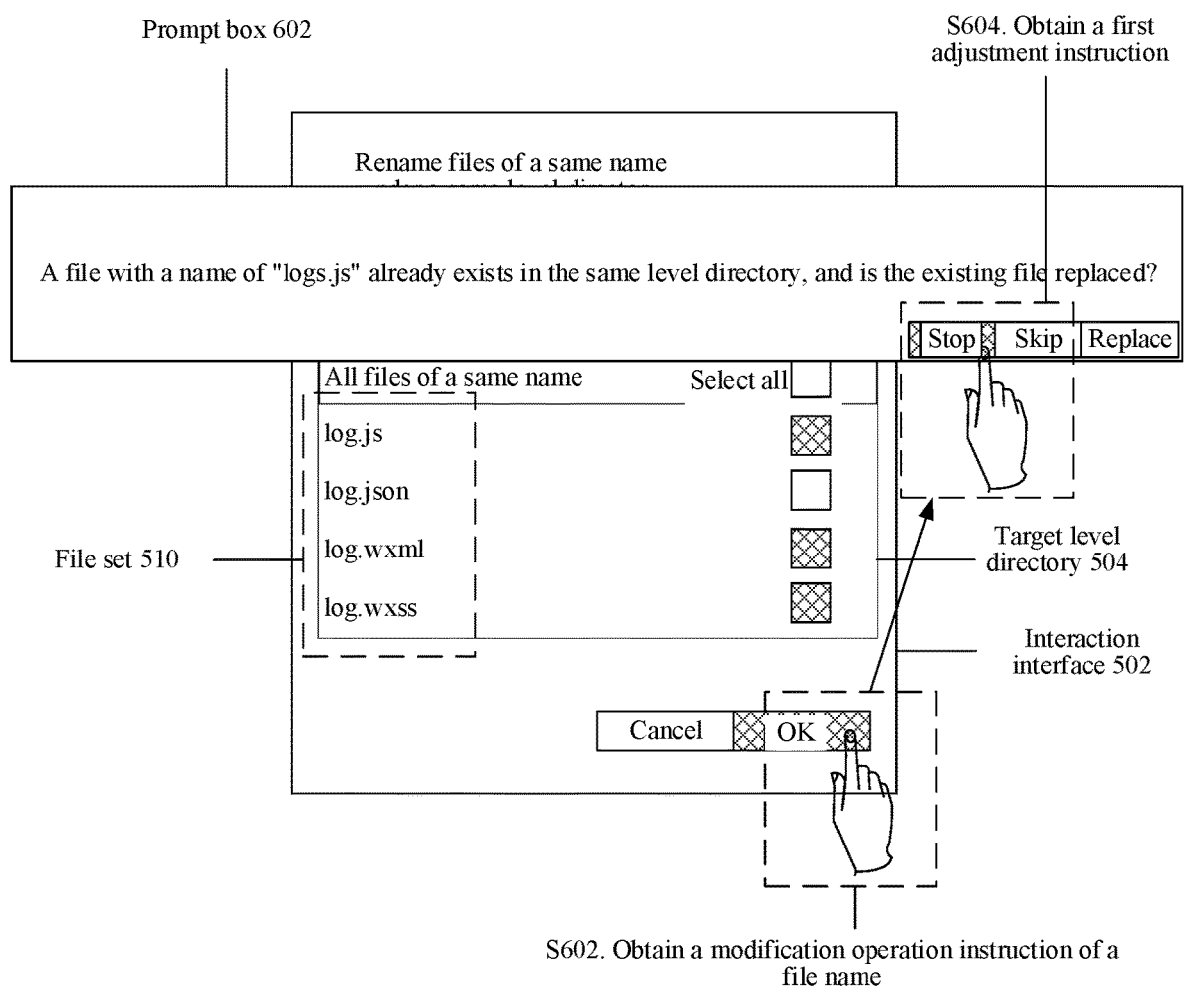
FIG. 6 is a schematic diagram of another exemplary method for modifying a file name according to an embodiment of this disclosure.

A description is further made by using an example. Optionally, as shown in FIG. 6, there is a prompt box 602 used for prompting "a file of a same name already exists in a same level directory". Optionally, as shown in FIG. 6, "a file with a name of "logs.js" already exists in a same level directory, and is the existing file replaced" is recorded, and a position for detecting an adjustment instruction operation further exists in the prompt box 602, optionally, as shown in the figure, for example, "stop", "skip", and "replace". Specific steps are as follows: step S602. Obtain a modification operation instruction for a file name (for example, a modification operation instruction of modifying a first file name to a second file name). Step S604. Obtain a first adjustment instruction ("stop" in a shade), the first adjustment instruction (for example, a modification operation instruction to stop modifying the first file name to the second file name) being used for instructing to stop performing name modification on object files in a file set.

According to this embodiment of this disclosure, a first adjustment instruction is obtained in a case that at least one object file has a same name as a file under the target level directory, the same name being used for indicating that files have a same file name and a same file name extension, and the first adjustment instruction being used for instructing to stop performing name modification on the object files in the file set; a current modification progress is obtained in response to the first adjustment instruction, the current modification progress being used for indicating that name modification on i object files in the file set has been currently completed, i being an integer greater than 1 and less than N, and N being a quantity of object files in the file set; and name modification on an $(i+1)^{th}$ object file to an $N^{th}$ object file in the file set is stopped, to achieve an objective that when the first adjustment instruction is obtained, name modification on the object files in the file set is stopped, thereby achieving an effect of improving the flexibility of file name modification.

In one implementation, in a case of the stopping performing name modification on an $(i+1)^{th}$ object file to an $N^{th}$ object file in the file set, the method further includes:

restoring file names of the first i object files in the file set to the first file name.

File names of the first i object files in the file set are restored to the first file name.

A description is further made by using an example. Optionally, for example, when name modification on the $(i+1)^{th}$ object file to the $N^{th}$ object file in the file set is stopped, the file names of the first i object files in the file set are restored to the first file name. In other words, files on which name modification is performed are not renamed and still retain previous names, and all rename operations are ended in advance.

According to this embodiment of this disclosure, file names of the first i object files in the file set are restored to the first file name, to achieve an objective that when modification is stopped, a name modification operation is ended, thereby improving an effect of improving the file name modification efficiency.

In one implementation, in a case of the modifying the file names of the object files in the file set from the first file name to a second file name, the method further includes the following steps.

S1. In a case that at least one object file has a same name as a file under the target level directory, determine the at least one object file as a first target object file.

S2. Obtain a second adjustment instruction, the second adjustment instruction being used for instructing to skip the first target object file and obtain a next object file for name modification.

In a case that at least one object file has a same name as a file under the target level directory, the at least one object file is determined as a first target object file; and a second adjustment instruction is obtained, the second adjustment instruction being used for instructing to skip the first target object file and obtain a next object file for name modification.

Figure 7:
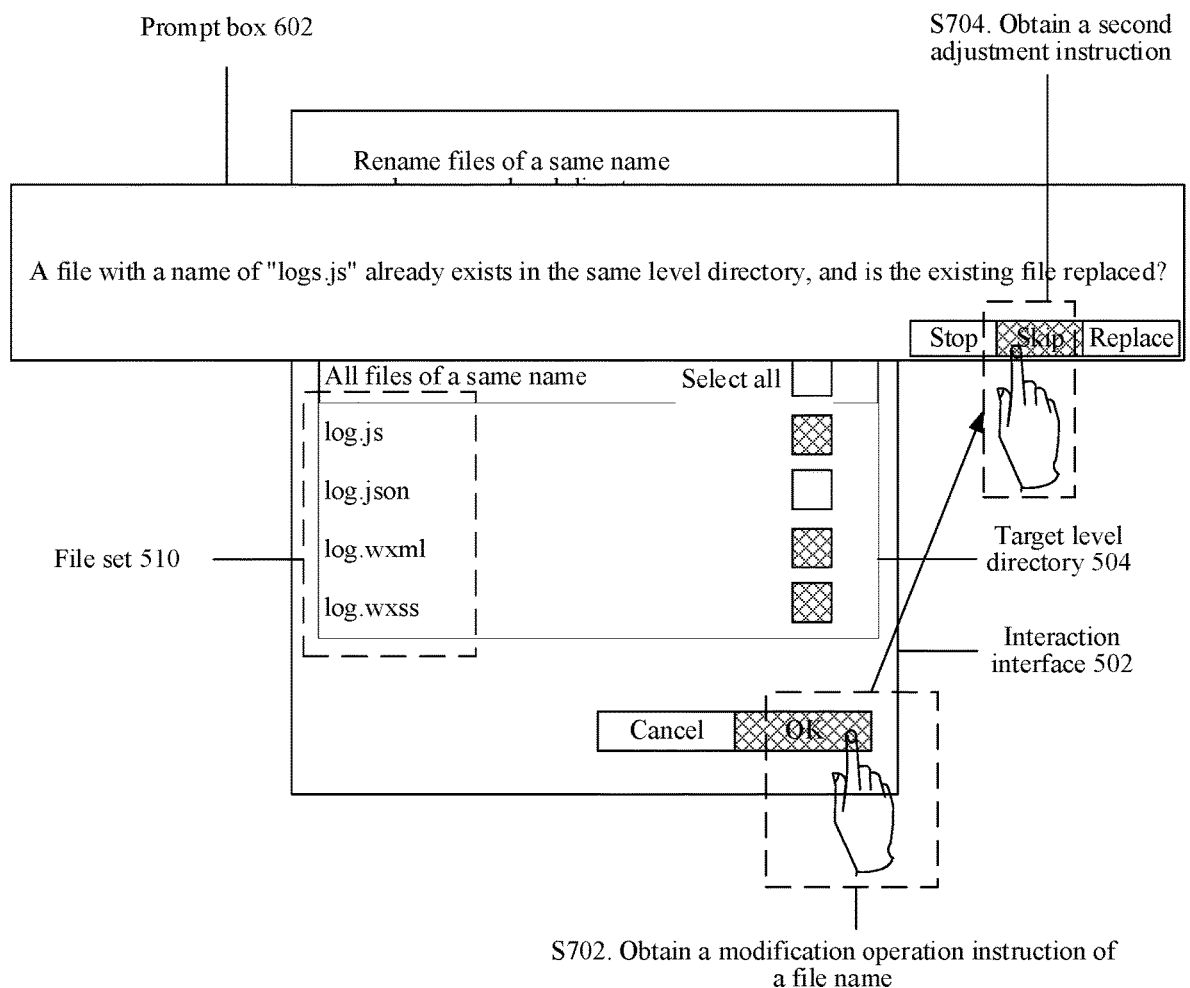
FIG. 7 is a schematic diagram of another exemplary method for modifying a file name according to an embodiment of this disclosure.

A description is further made for description. Optionally, as shown in FIG. 7, specific steps are as follows: step S702. Obtain a modification operation instruction (for example, a modification operation instruction to modify a first file name to a second file name) of a file name. Step S704. Obtain a second adjustment instruction ("skip" in a shade), the second adjustment instruction being used for instructing to skip name modification on object files in a file set (for example, a modification operation instruction to skip name modification on the object files and continuously modify other files in the file set from the first file name to the second file name).

According to this embodiment of this disclosure, in a case that at least one object file has a same name as a file under the target level directory, the at least one object file is determined as a first target object file; and a second adjustment instruction is obtained, the second adjustment instruction being used for instructing to skip the first target object file and obtain a next object file for name modification, to achieve an objective that when a modification operation instruction of a file name is obtain, name modification on the object files is skipped and file name modification on other files in the file set continues, thereby achieving an effect of improving the file name modification efficiency.

In one implementation, in a case of the modifying the file names of the object files in the file set from the first file name to a second file name, the method further includes the following steps.

S1. In a case that at least one object file has a same name as a file under the target level directory, determine the at least one object file as a second target object file and a file having a same name as the second target object file as a conflict file.

S2. Obtain a third adjustment instruction, the third adjustment instruction being used for instructing to replace the conflict file with the second target object file.

In a case that at least one object file has a same name as a file under the target level directory, the at least one object file is determined as a second target object file and a file having a same name as the second target object file is determined as a conflict file; and a third adjustment instruction is obtained, the third adjustment instruction being used for instructing to replace the conflict file with the second target object file.

Figure 8:
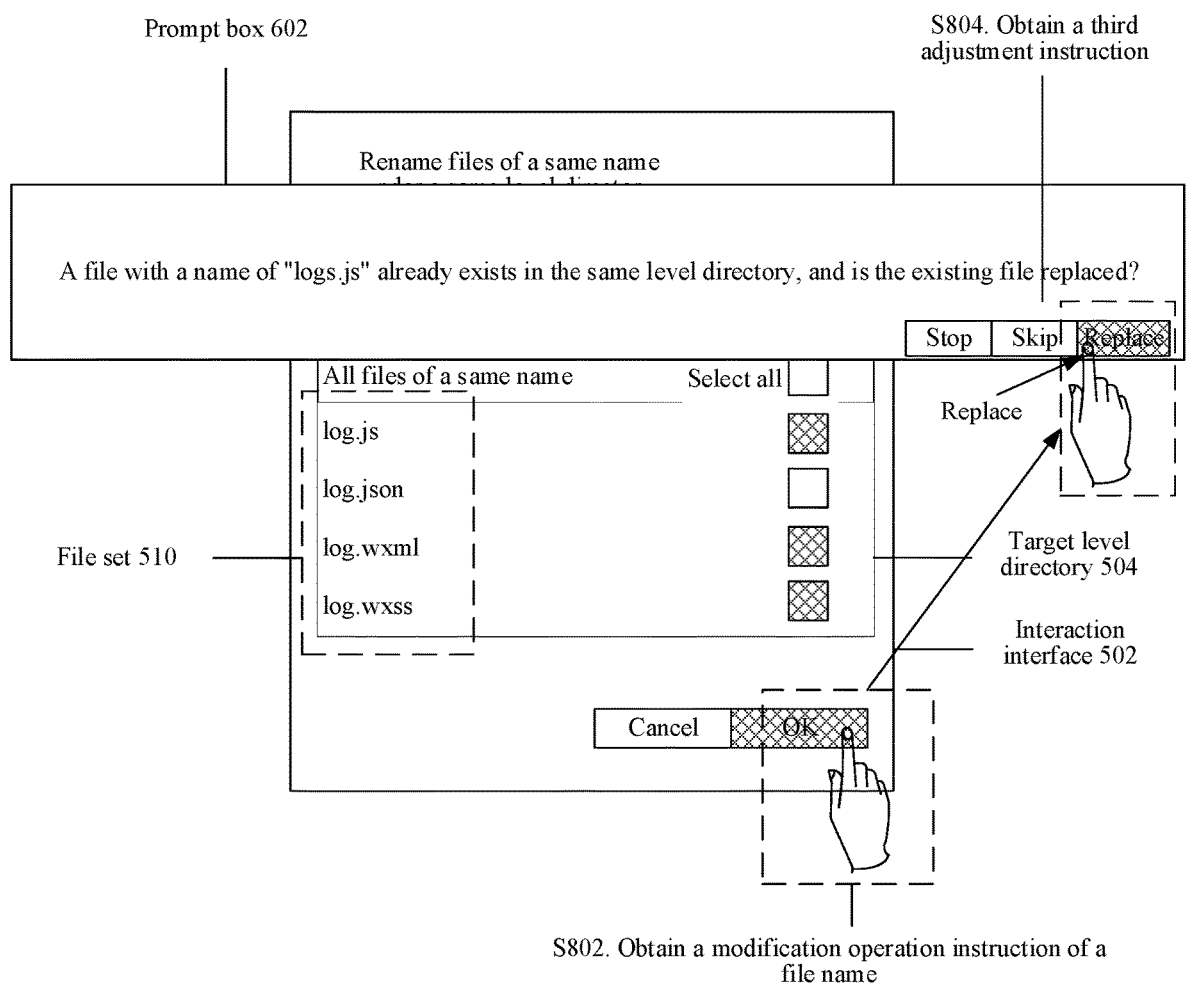
FIG. 8 is a schematic diagram of another exemplary method for modifying a file name according to an embodiment of this disclosure.

A description is further made for description. Optionally, as shown in FIG. 8, specific steps are as follows: step S802. Obtain a modification operation instruction (for example, a modification operation instruction to modify a first file name to a second file name) of a file name. Step S804. Obtain a third adjustment instruction ("replace" in a shade), the third adjustment instruction being used for instructing to perform name modification on object files in a file set and replace the files of which the names have been modified with files of a same name (a file main name such as "logs") and a same type (a file name extension such as "js").

According to this embodiment of this disclosure, in a case that at least one object file has a same name as a file under the target level directory, the at least one object file is determined as a second target object file and a file having a same name as the second target object file is determined as a conflict file; and a third adjustment instruction is obtained, the third adjustment instruction being used for instructing to replace the conflict file with the second target object file, to achieve an objective of replacing a file of which a name has been modified with a file of the same name, thereby achieving an effect of improving the flexibility of file name modification.

In one implementation, the determining a first target file of which a name is to be modified includes the following steps.

S1. Display an editor directory tree corresponding to a target folder, the target folder including at least the first target file.

S2. Determine the first target file from the editor directory tree.

An editor directory tree corresponding to a target folder is displayed, the target folder including at least the first target file; and the first target file is determined from the editor directory tree.

Figure 9:
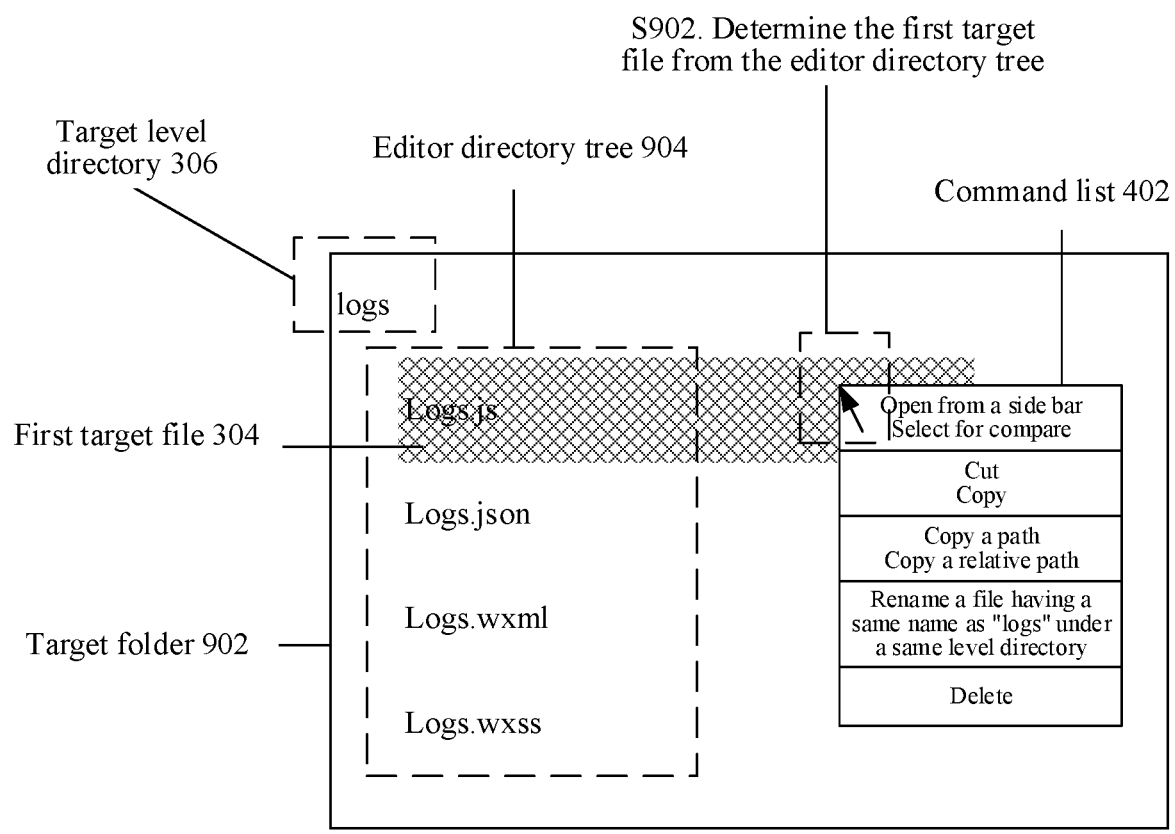
FIG. 9 is a schematic diagram of another exemplary method for modifying a file name according to an embodiment of this disclosure.

A description is further made by using an example. Optionally, as shown in FIG. 9, there are a target folder 902 and an editor directory tree 904 that are displayed on an interaction interface. The editor directory tree 904 of the target folder 902 includes the first target file 304 and other files of the same name. Specific steps are as follows: step S902. Determine the first target file 304 in the editor directory tree 904. Optionally, a determining operation may be triggered by using a right arrow key or a left arrow key, but is not limited thereto.

According to this embodiment of this disclosure, an editor directory tree corresponding to a target folder is displayed, the target folder including at least the first target file; and the first target file is determined from the editor directory tree, to achieve an objective of accurately determining the first target file from the editor directory tree, thereby achieving an effect of accurately determining the first target file.

Figure 10:
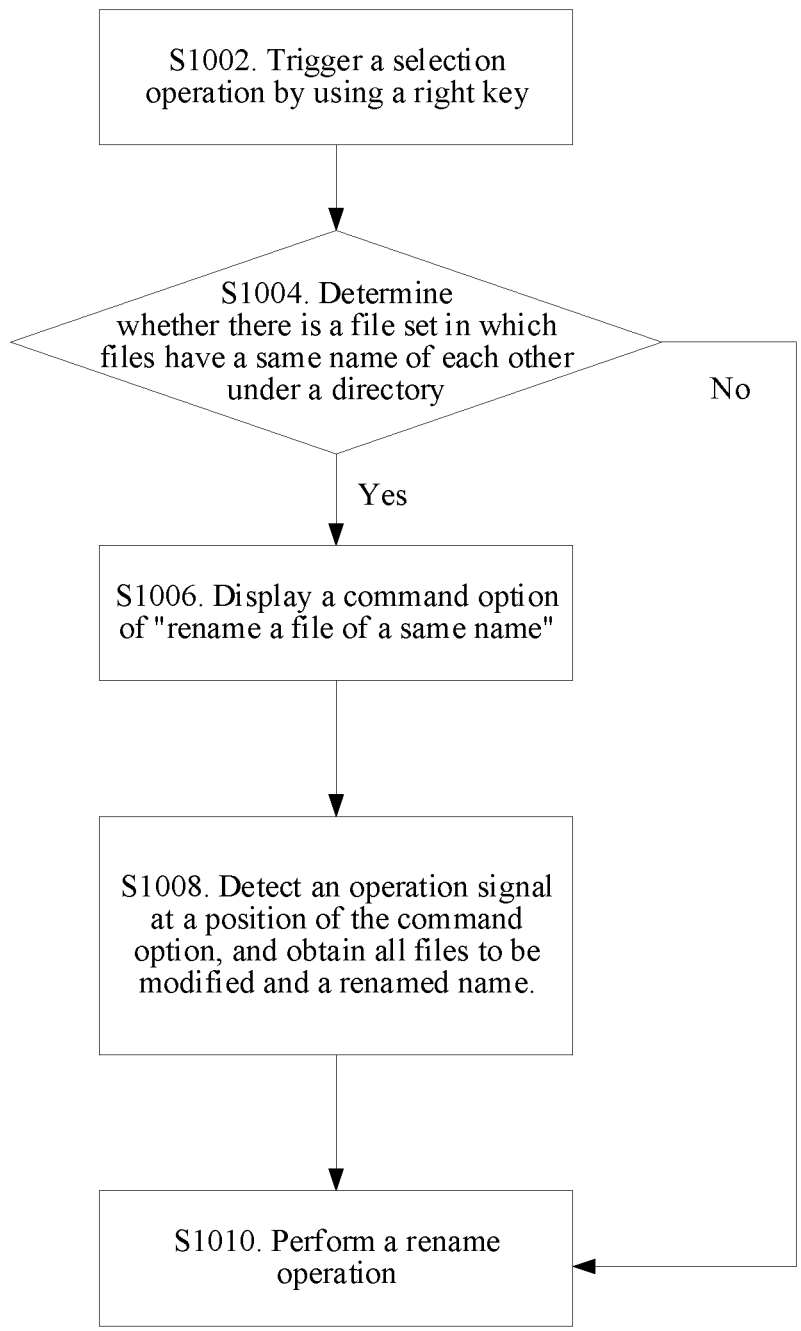
FIG. 10 is a schematic flowchart of another exemplary method for modifying a file name according to an embodiment of this disclosure.

In one implementation, for example, a specific foreground application scenario shown in FIG. 10, specific steps are as follows.

Step S1002. Detect a selection operation signal triggered by a right key at a position of a target file in an interaction interface.

Step S1004. Determine whether there is a file set in which files have a same name of each other in a same level directory under which the target file is located.

Step S1006. Display a command option of "rename a file of a same name" at the position of the target file in the interaction interface, perform step 1008 if there is the file set, and perform step S1010 in there is no file set.

Step S1008. Detect an operation signal at a position of the command option, and obtain all files to be modified and a renamed name.

Step S1010. Perform a rename operation and modify an original name of the target file to the renamed name.

Figure 11:
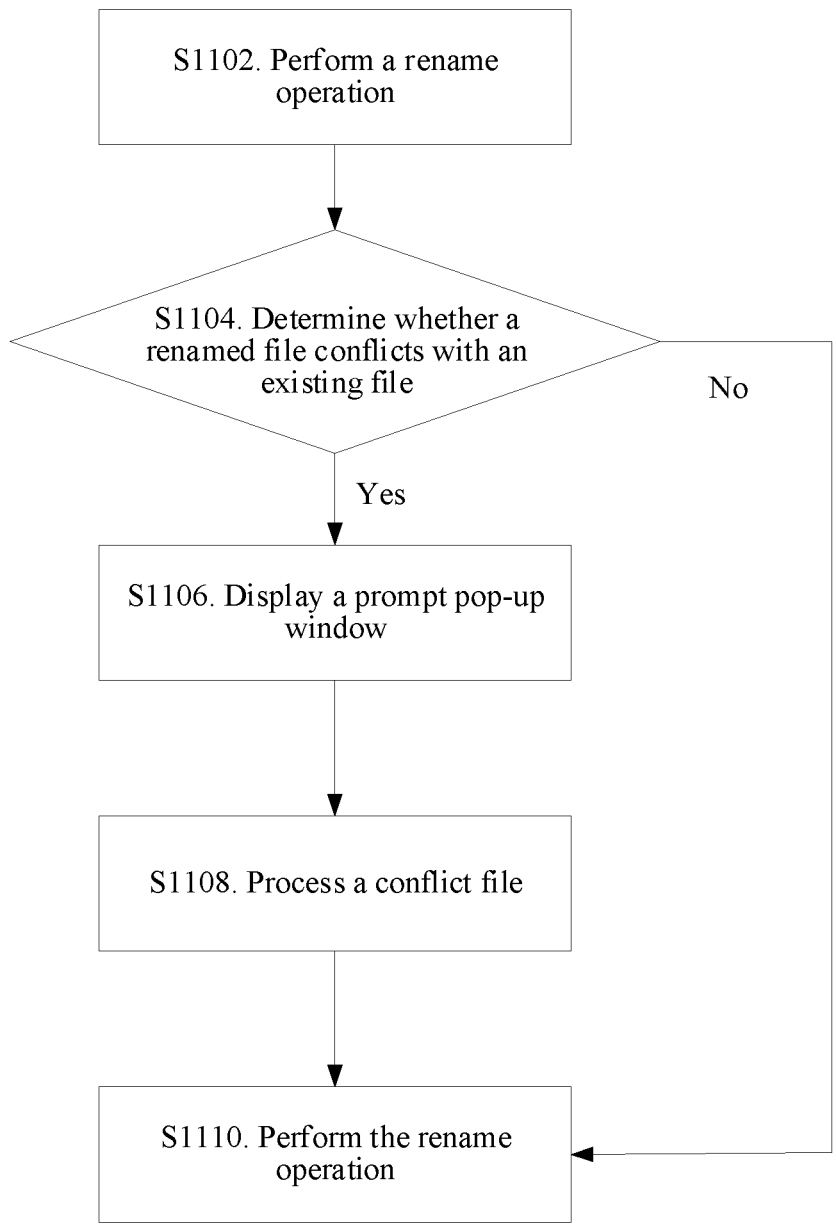
FIG. 11 is a schematic flowchart of another exemplary method for modifying a file name according to an embodiment of this disclosure.

In one implementation, for example, a specific foreground application scenario shown in FIG. 11, specific steps are as follows.

Step S1102. Perform a rename operation.

Step S1104. Determine whether a renamed file conflicts with an existing file, perform step S1106 if the renamed file conflicts with the existing file, and perform step S1110 if the renamed file does not conflict with the existing file.

Step S1106. Display a prompt pop-up window, the pop-up window being configured to trigger a processing signal of a conflict file.

Step S1108. Process the conflict file according to the processing signal.

Step S1110. Perform the rename operation.

For brief description, the foregoing method embodiments are redisplayed as a series of action combinations. However, a person skilled in the art is to appreciate that this application is not limited to the described order of the actions, because according to this application, some steps may be performed in other orders or simultaneously. In addition, a person skilled in the art is further to understand that the embodiments described in this specification are all exemplary embodiments, and the involved actions and modules are not necessarily required by this application.

Figure 12:
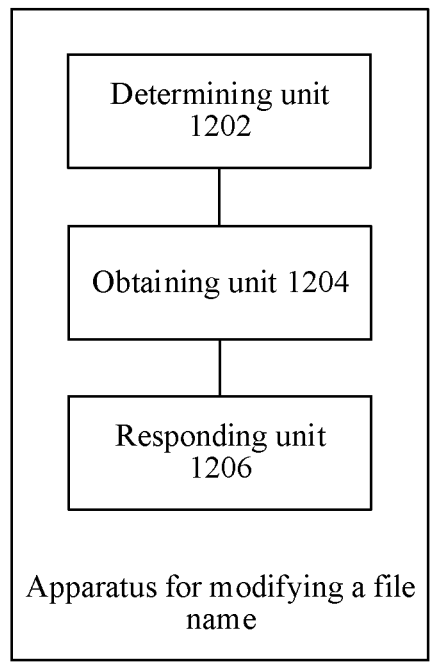
FIG. 12 is a schematic diagram of an exemplary apparatus for modifying a file name according to an embodiment of this disclosure.
Figure 13:
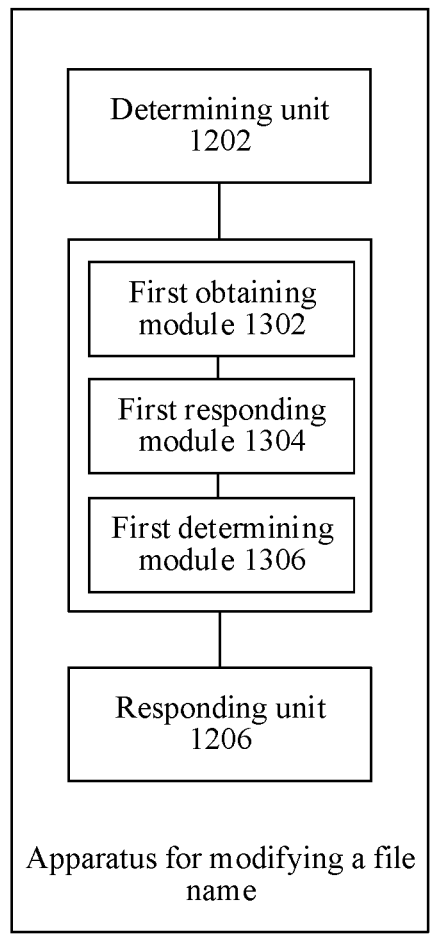
FIG. 13 is a schematic diagram of another exemplary apparatus for modifying a file name according to an embodiment of this disclosure.
Figure 14:
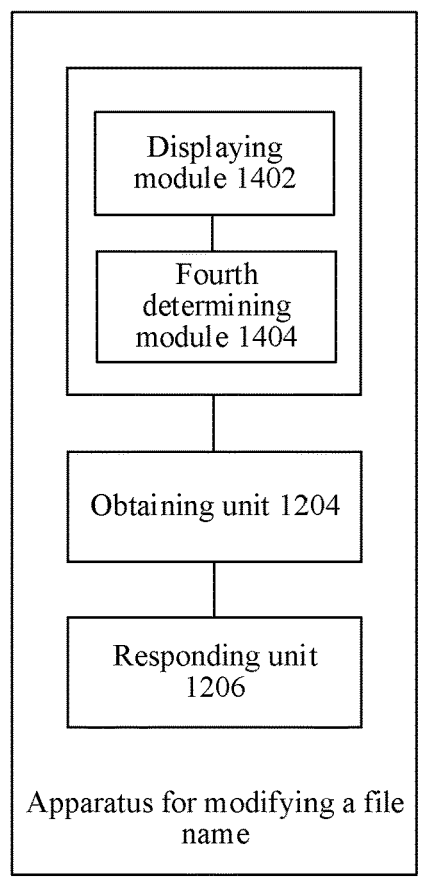
FIG. 14 is a schematic diagram of another exemplary apparatus for modifying a file name according to an embodiment of this disclosure.

According to another aspect of an embodiment of this disclosure, an apparatus for modifying a file name configured to implement the method for modifying a file name is further provided. In this disclosure, a unit and a module may be hardware such as a combination of electronic circuitries; firmware; or software such as computer instructions. The unit and the module may also be any combination of hardware, firmware, and software. In some implementation, a unit may include at least one module. As shown in FIG. 12, the apparatus includes:

a determining unit 1202, configured to determine a first target file of which a name is to be modified, the first target file being currently located under a target level directory, and a current file name of the first target file being a first file name;

an obtaining unit 1204, configured to obtain a first operation instruction triggered by performing an operation on the first target file, the first operation instruction being used for instructing to perform a name modification operation on object files in a file set, and the object files in the file set being located under the target level directory and having a same file name as the first target file; and a responding unit 1206, configured to modify the file names of the object files in the file set from the first file name to a second file name in response to the first operation instruction.

Optionally, in this embodiment, the apparatus for modifying a file name is applicable to, but not limited to, a scenario of renaming a plurality of files with a same name in batches, to make it files of the same name with another name. A file may include, but not limited to, a file main name and an extension name. Optionally, in this embodiment, the file name may be, but not limited to, the file main name. File names of files under the target level directory may be, but not limited to, the same (files of a same name).

A first target file of which a name is to be modified is determined, the first target file being currently located under a target level directory, and a current file name of the first target file being a first file name; a first operation instruction triggered by performing an operation on the first target file is obtained, the first operation instruction being used for instructing to perform a name modification operation on object files in a file set, and the object files in the file set being located under the target level directory and having a same file name as the first target file; and the file names of the object files in the file set are modified from the first file name to a second file name in response to the first operation instruction.

For the specific embodiments, reference may be made to the example shown in the foregoing method for modifying a file name. Details are not described herein again in this example.

According to this embodiment of this disclosure, a first target file of which a name is to be modified is determined, the first target file being currently located under a target level directory, and a current file name of the first target file being a first file name; a first operation instruction triggered by performing an operation on the first target file is obtained, the first operation instruction being used for instructing to perform a name modification operation on object files in a file set, and the object files in the file set being located under the target level directory and having a same file name as the first target file; and the file names of the object files in the file set are modified from the first file name to a second file name in response to the first operation instruction. Uniform name modification is performed on files under a target level directory and having a same name, to achieve a technical objective of reducing redundant operations in a file name modification process, thereby achieving a technical effect of improving the file name modification efficiency.

In one implementation, the obtaining unit 1204 includes:

a first obtaining module 1302, configured to obtain a second operation instruction triggered by performing the operation on the first target file, the second operation instruction being used for requesting to obtain all files having a same file name as the first target file under the target level directory;

a first responding module 1304, configured to display all the files in response to the second operation instruction; and a first determining module 1306, configured to determine the object files in the file set from all the files, and generate the first operation instruction based on the file set.

For the specific embodiments, reference may be made to the example shown in the foregoing method for modifying a file name. Details are not described herein again in this example.

In one implementation, the first determining module includes: a checking subunit, configured to use files checked in configuration items respectively corresponding to all the files as the object files in the file set; and further includes: an obtaining subunit, configured to obtain the configured second file name when determining the object files from all the files.

For the specific embodiments, reference may be made to the example shown in the foregoing method for modifying a file name. Details are not described herein again in this example.

In one implementation, the apparatus further includes:

a second obtaining module, configured to, in a case that the file names of the object files in the file set are modified from the first file name to the second file name, obtain a first adjustment instruction in a case that at least one object file has a same name as a file under the target level directory, the same name being used for indicating that files have a same file name and a same file name extension, and the first adjustment instruction being used for instructing to stop performing name modification on the object files in the file set;

a second responding module, configured to, in a case that the file names of the object files in the file set are modified from the first file name to the second file name, obtain a current modification progress in response to the first adjustment instruction, the current modification progress being used for indicating that name modification on i object files in the file set has been currently completed, i being an integer greater than 1 and less than N, and N being a quantity of object files in the file set; and a stopping module, configured to, in a case that the file names of the object files in the file set are modified from the first file name to the second file name, stop performing name modification on an $(i+1)^{th}$ object file to an $N^{th}$ object file in the file set.

For the specific embodiments, reference may be made to the example shown in the foregoing method for modifying a file name. Details are not described herein again in this example.

In one implementation, the apparatus further includes: a restoring module, configured to, in a case that name modification on an $(i+1)^{th}$ object file to an $N^{th}$ object file in the file set is stopped, restore file names of the first i object files in the file set to the first file name.

For the specific embodiments, reference may be made to the example shown in the foregoing method for modifying a file name. Details are not described herein again in this example.

In one implementation, the apparatus further includes:

a second determining module, configured to, in a case that the file names of the object files in the file set are modified from the first file name to the second file name, and in a case that at least one object file has a same name as a file under the target level directory, determine the at least one object file as a first target object file; and a third obtaining module, configured to, in a case that the file names of the object files in the file set are modified from the first file name to the second file name, obtain a second adjustment instruction, the second adjustment instruction being used for instructing to skip the first target object file and obtain a next object file for name modification.

For the specific embodiments, reference may be made to the example shown in the foregoing method for modifying a file name. Details are not described herein again in this example.

In one implementation, the apparatus further includes:

a third determining module, configured to, in a case that the file names of the object files in the file set are modified from the first file name to the second file name, and in a case that at least one object file has a same name as a file under the target level directory, determine the at least one object file as a second target object file and a file having a same name as the second target object file as a conflict file; and a fourth obtaining module, configured to, in a case that the file names of the object files in the file set are modified from the first file name to the second file name, obtain a third adjustment instruction, the third adjustment instruction being used for instructing to replace the conflict file with the second target object file.

For the specific embodiments, reference may be made to the example shown in the foregoing method for modifying a file name. Details are not described herein again in this example.

In one implementation, the determining unit 1202 includes: a displaying module 1402, configured to display an editor directory tree corresponding to a target folder, the target folder including at least the first target file; and a fourth determining module 1404, configured to determine the first target file from the editor directory tree.

For the specific embodiments, reference may be made to the example shown in the foregoing method for modifying a file name. Details are not described herein again in this example.

Figure 15:
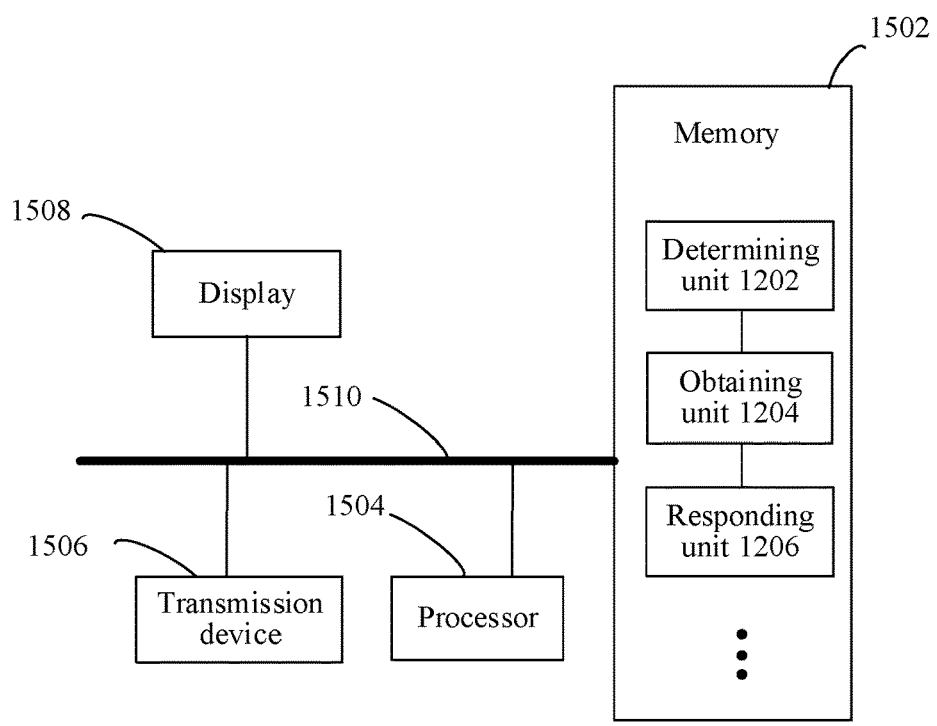
FIG. 15 is a schematic structural diagram of an exemplary electronic device according to an embodiment of this disclosure.

According to yet another aspect of an embodiment of this disclosure, an electronic device for implementing the method for modifying a file name is further provided. As shown in FIG. 15, the electronic device includes a memory 1502 and a processor 1504. The memory 1502 stores computer-readable instructions, and the processor 1504 is configured to perform the steps in any one of the foregoing method embodiments through the computer-readable instructions.

Optionally, in this embodiment, the electronic device may be located in at least one of a plurality of network devices in a computer network.

Optionally, in this embodiment, the processor may be configured to perform the following steps by using the computer-readable instructions.

S1. Determine a first target file of which a name is to be modified, the first target file being currently located under a target level directory, and a current file name of the first target file being a first file name.

S2. Obtain a first operation instruction triggered by performing an operation on the first target file, the first operation instruction being used for instructing to perform a name modification operation on object files in a file set, and the object files in the file set being located under the target level directory and having a same file name as the first target file.

S3. Modify the file names of the object files in the file set from the first file name to a second file name in response to the first operation instruction.

A person of ordinary skill in the art may understand that, the structure shown in FIG. 15 is only schematic. The electronic device may be a terminal device such as a smartphone (such as an Android mobile phone or an iOS mobile phone), a tablet computer, a palmtop computer, a mobile Internet device (MID), or a PAD. FIG. 15 does not constitute a limitation on a structure of the foregoing electronic device. For example, the electronic device may further include more or fewer components (for example, a network interface) than those shown in FIG. 15, or have configuration different from that shown in FIG. 15.

The memory 1502 may be configured to store a software program and module, for example, the computer-readable instructions or modules corresponding to the method and the apparatus for modifying a file name in the embodiments of this disclosure. The processor 1504 runs the software program and module stored in the memory 1502, to implement various functional applications and data processing, that is, implement the foregoing method for modifying a file name. The memory 1502 may include a high-speed random access memory, and may also include a non-volatile memory, for example, one or more magnetic storage apparatuses, a flash memory, or another non-volatile solid-state memory. In some embodiments, the memory 1502 may further include memories remotely disposed relative to the processor 1504, and the remote memories may be connected to a terminal through a network. Examples of the network include, but are not limited to, the Internet, an intranet, a local area network, a mobile communication network, and a combination thereof. The memory 1502 may specifically store, but is not limited to, information such as a first file name, a first operation instruction, and a second file name. In an example, as shown in FIG. 15, the memory 1502 may, but is not limited to, include the determining unit 1202, the obtaining unit 1204, and the responding unit 1206 in the foregoing apparatus for modifying a file name. In addition, the memory may further include, but not limited to, other modules and units in the foregoing apparatus for modifying a file name. Details are not described in this example again.

Optionally, the electronic device includes a transmission device 1506, and the transmission device 1506 is configured to receive or send data through a network. Specific instances of the foregoing network may include a wired network and a wireless network. In an example, the transmission apparatus 1506 includes a network interface controller (NIC). The NIC may be connected to another network device and a router by using a network cable, so as to communicate with the Internet or a local area network. In an example, the transmission device 1506 is a radio frequency (RF) module, which communicates with the Internet in a wireless manner. In addition, the electronic device further includes: a display 1508, configured to display the information such as the first file name, the first operation instruction, and the second file name; and a connection bus 1510, configured to connect various modular components in the foregoing electronic device.

A person skilled in the art may understand that, the structure shown in FIG. 15 is only a block diagram of a part of a structure related to a solution of this application and does not limit the computer device to which the solution of this application is applied. Specifically, the computer device may specifically include more or fewer components than those in the drawings, or include a combination of some components, or include different component layouts.

According to yet another aspect of an embodiment of this disclosure, a computer-readable storage medium is further provided. The storage medium stores computer-readable instructions, the computer-readable instructions being configured to perform, when run, the steps in any one of the foregoing method embodiments.

Optionally, in this embodiment, the computer-readable storage medium may be configured to store the computer-readable instructions for performing the following steps: displaying a first target file of which a name is to be modified, the first target file being currently located under a target level directory, and a current file name of the first target file being a first file name; receiving a file name modification operation for the first target file, the file name modification operation being used for instructing to perform a name modification operation on object files in a file set, and the object files in the file set being located under the target level directory and having a same file name as the first target file; and modifying the file names of the object files in the file set from the first file name to a second file name in response to the file selection operation.

Optionally, in this embodiment, a person of ordinary skill in the art may understand that all or some of the steps of the methods in the foregoing embodiments may be implemented by a program instructing relevant hardware of the terminal device. The program may be stored in a non-transitory computer-readable storage medium. The non-transitory storage medium may include a flash disk, a read-only memory (ROM), a random access memory (RAM), a magnetic disk, an optical disk, and the like.

A person of ordinary skill in the art may understand that all or some of the procedures of the methods of the foregoing embodiments may be implemented by computer-readable instructions instructing relevant hardware. The computer-readable instructions may be stored in a non-transitory computer-readable storage medium. When the computer-readable instructions are executed, the procedures of the embodiments of the foregoing methods may be included. References to the memory, the storage, the database, or other media used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDR_SDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The sequence numbers of the foregoing embodiments of this disclosure are merely for description purposes, and are not intended to indicate the preference among the embodiments.

In some embodiments, a computer program product or a computer program is provided. The computer program product or the computer program includes computer instructions, and the computer instructions are stored in a non-transitory computer-readable storage medium. The processor of the computer device reads the computer instructions from the non-transitory computer-readable storage medium, and the processor executes the computer instructions, to cause the computer device to perform the steps in the method embodiments.

When the integrated unit in the foregoing embodiments is implemented in a form of a software functional unit and sold or used as an independent product, the integrated unit may be stored in the foregoing non-transitory computer-readable storage medium. Based on such an understanding, the technical solutions of this application essentially, or the part contributing to the related art, or all or some of the technical solutions may be implemented in a form of a software product. The computer software product is stored in a non-transitory storage medium and includes several instructions for instructing one or more computer devices (which may be a personal computer, a server, a network device, and the like) to perform all or some of the steps of the methods described in the embodiments of this disclosure.

In the foregoing embodiments of this disclosure, descriptions of the embodiments have respective focuses. As for parts that are not described in detail in one embodiment, reference may be made to the relevant descriptions of the other embodiments. It is to be understood that although the steps in the flowcharts of the embodiments of this disclosure are displayed in sequence according to arrows, the steps are not necessarily performed in the sequence indicated by the arrows. Unless otherwise explicitly specified in this application, execution of the steps is not strictly limited, and the steps may be performed in other sequences. In addition, at least some of the steps in the foregoing embodiments may include a plurality of substeps or a plurality of stages. These substeps or stages are not necessarily completed at the same moment, but may be performed at different moments. Besides, these substeps or stages may not be necessarily performed sequentially, but may be performed in turn or alternately with other steps or at least some of substeps or stages of other steps.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms. The units described as separate components may or may not be physically separated, and the components displayed as units may or may not be physical units, and may be located in one place or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A method for modifying a file name, performed by a computer device, the method comprising:
    displaying a first target file of which a name is to be modified, the first target file being currently located under a target level directory, and a current file name of the first target file being a first file name;
    receiving a file name modification operation for the first target file, the file name modification operation being used for instructing to perform a name modification operation on object files in a file set, and the object files being located under the target level directory and having a same file name as the first target file;
    determining a full destination file name for each of the object files, a full file name comprising a file name and a file name extension; and
    based on a determination whether the full destination file name being the same as a full file name of an existing file under the target level directory, modifying file names of the object files in the file set from the first file name to a second file name in response to the file name modification operation.

2. The method according to claim 1, further comprising:
    displaying a file name input region for inputting a modified file name; and
    obtaining the second file name in response to a name input operation for the name input region.

3. The method according to claim 1, wherein modifying the file names of the object files in the file set from the first file name to the second file name comprises:
    for each of the object files:
        in response to the full destination file name being the same as a full file name of an existing file under the target level directory:
            obtaining a first adjustment instruction used for instructing to stop performing name modification on the object files in the file set;
            obtaining a current file name modification progress in response to the first adjustment instruction, the current file name modification progress being used for indicating that file name modification on i object files in the file set has been completed, i being an integer less than N, and N being a quantity of object files in the file set; and
            stopping performing file name modification on an $(i+1)^{th}$ object file to an $N^{th}$ object file in the file set; and
        in response to the full destination file name being different with a full file name of any existing file under the target level directory, modifying file name of the each of the object files in the file set from the first file name to the second file name.

4. The method according to claim 3, wherein after stopping performing the file name modification, the method further comprises:
restoring file names of the first i object files in the file set back to the first file name.

5. The method according to claim 1, wherein modifying the file names of the object files in the file set from the first file name to the second file name comprises:
in response to the full destination file name being the same as a full file name of an existing file under the target level directory, obtaining a second adjustment instruction, the second adjustment instruction being used for instructing to skip modifying file name for the each of the object files, and proceeding to a next object file in the file set for file name modification; and
in response to the full destination file name being different with a full file name of any existing file under the target level directory, modifying file name of the each of the object files in the file set from the first file name to the second file name.

6. The method according to claim 1, wherein modifying the file names of the object files in the file set from the first file name to the second file name comprises:
in response to the full destination file name being the same as a full file name of an existing file under the target level directory, obtaining a third adjustment instruction, the third adjustment instruction being used for instructing to replace the existing file with the each of the object file; and
in response to the full destination file name being different with a full file name of any existing file under the target level directory, modifying file name of the each of the object files in the file set from the first file name to the second file name.

7. The method according to claim 1, wherein displaying the first target file comprises:
displaying an editor directory tree corresponding to the target level directory comprising the first target file; and
determining and displaying the first target file from the editor directory tree.

8. A device for modifying a file name, the device comprising a memory for storing computer instructions and a processor in communication with the memory, wherein, when the processor executes the computer instructions, the processor is configured to cause the device to:
display a first target file of which a name is to be modified, the first target file being currently located under a target level directory, and a current file name of the first target file being a first file name;
receive a file name modification operation for the first target file, the file name modification operation being used for instructing to perform a name modification operation on object files in a file set, and the object files being located under the target level directory and having a same file name as the first target file;
determine a full destination file name for each of the object files, a full file name comprising a file name and a file name extension; and
based on a determination whether the full destination file name being the same as a full file name of an existing file under the target level directory, modify file names of the object files in the file set from the first file name to a second file name in response to the file name modification operation.

9. The device according to claim 8, wherein, the processor is configured to further cause the device to:
display a file name input region for inputting a modified file name; and
obtain the second file name in response to a name input operation for the name input region.

10. The device according to claim 8, wherein, when the processor is configured to cause the device to modify the file names of the object files in the file set from the first file name to the second file name, the processor is configured to cause the device to:
for each of the object files:
in response to the full destination file name being the same as a full file name of an existing file under the target level directory:
obtain a first adjustment instruction used for instructing to stop performing name modification on the object files in the file set;
obtain a current file name modification progress in response to the first adjustment instruction, the current file name modification progress being used for indicating that file name modification on i object files in the file set has been completed, i being an integer less than N, and N being a quantity of object files in the file set; and
stop performing file name modification on an $(i+1)^{th}$ object file to an $N^{th}$ object file in the file set; and
in response to the full destination file name being different with a full file name of any existing file under the target level directory, modify file name of the each of the object files in the file set from the first file name to the second file name.

11. The device according to claim 10, wherein, after the processor is configured to cause the device to stop performing the file name modification, the processor is configured to further cause the device to:
restore file names of the first i object files in the file set back to the first file name.

12. The device according to claim 8, wherein, when the processor is configured to cause the device to modify the file names of the object files in the file set from the first file name to the second file name, the processor is configured to cause the device to:
in response to the full destination file name being the same as a full file name of an existing file under the target level directory, obtain a second adjustment instruction, the second adjustment instruction being used for instructing to skip modifying file name for the each of the object files, and proceed to a next object file in the file set for file name modification; and
in response to the full destination file name being different with a full file name of any existing file under the target level directory, modify file name of the each of the object files in the file set from the first file name to the second file name.

13. The device according to claim 8, wherein, when the processor is configured to cause the device to modify the file names of the object files in the file set from the first file name to the second file name, the processor is configured to cause the device to:
in response to the full destination file name being the same as a full file name of an existing file under the target level directory, obtain a third adjustment instruction, the third adjustment instruction being used for instructing to replace the existing file with the each of the object file; and
in response to the full destination file name being different with a full file name of any existing file under the target level directory, modify file name of the each of the object files in the file set from the first file name to the second file name.

14. The device according to claim 8, wherein, when the processor is configured to cause the device to display the first target file comprises, the processor is configured to cause the device to:
display an editor directory tree corresponding to the target level directory comprising the first target file; and
determine and displaying the first target file from the editor directory tree.

15. A non-transitory storage medium for storing computer readable instructions, the computer readable instructions, when executed by a processor, causing the processor to:
display a first target file of which a name is to be modified, the first target file being currently located under a target level directory, and a current file name of the first target file being a first file name;
receive a file name modification operation for the first target file, the file name modification operation being used for instructing to perform a name modification operation on object files in a file set, and the object files being located under the target level directory and having a same file name as the first target file;
determine a full destination file name for each of the object files, a full file name comprising a file name and a file name extension; and
based on a determination whether the full destination file name being the same as a full file name of an existing file under the target level directory, modify file names of the object files in the file set from the first file name to a second file name in response to the file name modification operation.

16. The non-transitory storage medium according to claim 15, wherein the computer readable instructions further cause the processor to:
display a file name input region for inputting a modified file name; and
obtain the second file name in response to a name input operation for the name input region.

17. The non-transitory storage medium according to claim 15, wherein, when the computer readable instructions cause the processor to modify the file names of the object files in the file set from the first file name to the second file name, the computer readable instructions cause the processor to: for each of the object files:
in response to the full destination file name being the same as a full file name of an existing file under the target level directory:
obtain a first adjustment instruction used for instructing to stop performing name modification on the object files in the file set;
obtain a current file name modification progress in response to the first adjustment instruction, the current file name modification progress being used for indicating that file name modification on i object files in the file set has been completed, i being an integer less than N, and N being a quantity of object files in the file set; and
stop performing file name modification on an $(i+1)^{th}$ object file to an $N^{th}$ object file in the file set; and
in response to the full destination file name being different with a full file name of any existing file under the target level directory, modify file name of the each of the object files in the file set from the first file name to the second file name.

18. The non-transitory storage medium according to claim 17, wherein, after the computer readable instructions cause the processor to stop performing the file name modification, the computer readable instructions further cause the processor to:
restore file names of the first i object files in the file set back to the first file name.

19. The non-transitory storage medium according to claim 15, wherein, when the computer readable instructions cause the processor to modify the file names of the object files in the file set from the first file name to the second file name, the computer readable instructions cause the processor to:
in response to the full destination file name being the same as a full file name of an existing file under the target level directory, obtain a second adjustment instruction, the second adjustment instruction being used for instructing to skip modifying file name for the each of the object files, and proceed to a next object file in the file set for file name modification; and
in response to the full destination file name being different with a full file name of any existing file under the target level directory, modify file name of the each of the object files in the file set from the first file name to the second file name.

20. The non-transitory storage medium according to claim 15, wherein, when the computer readable instructions cause the processor to modify the file names of the object files in the file set from the first file name to the second file name, the computer readable instructions cause the processor to:
in response to the full destination file name being the same as a full file name of an existing file under the target level directory, obtain a third adjustment instruction, the third adjustment instruction being used for instructing to replace the existing file with the each of the object file; and
in response to the full destination file name being different with a full file name of any existing file under the target level directory, modify file name of the each of the object files in the file set from the first file name to the second file name.

* * * * *